May 25, 1937.                C. M. RIDGWAY                2,081,601
                   AUTOMATIC SIDE STREAM CONTROL SYSTEM
                          Filed May 31, 1935
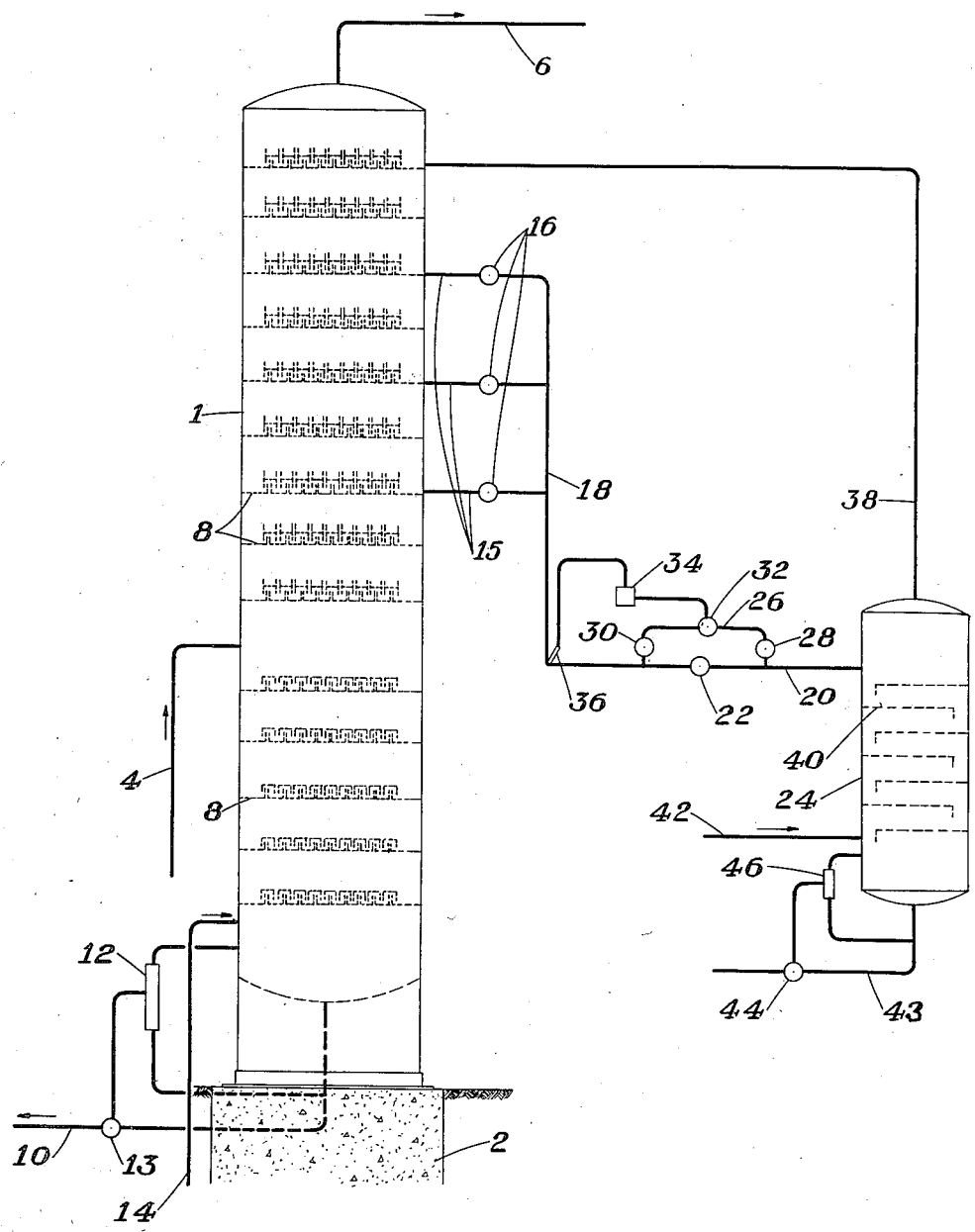
INVENTOR
Charles M. Ridgway
BY
Edward H. Lang
ATTORNEY Patented May 25, 1937

2,081,601

UNITED STATES PATENT OFFICE 2,081,601

AUTOMATIC SIDE STREAM CONTROL SYSTEM

Charles M. Ridgway, Muskogee, Okla., assignor to The Pure Oil Company, Chicago, Ill., a corporation of Ohio Application May 31, 1935, Serial No. 24,170

4 Claims. (Cl. 196—132)

This invention relates to method and apparatus for automatically controlling the withdrawal of a side stream from a fractionating tower and is more particularly concerned with method and apparatus for withdrawing a side stream of any desired uniform quality or boiling range.

The composition of crude oil which may be charged to fractionating equipment will vary depending upon the source from which it is obtained. In order to obtain a constant quality or uniform boiling range side stream from a fractionating tower when various types of crudes are being treated, it is necessary to exercise careful regulation of the fractionating tower. Likewise, variations in the rate of charge will affect the quality of the side stream unless conditions within the fractionating tower are controlled to take into account variations in charging rate.

In the operation of fractionating equipment accurate control instruments are used to keep the temperature of the charging stock, the top tower temperature, and the column pressure constant. However it may be desirable at times to either change the rate of charge or the type of crude charged to the fractionating unit. In such cases it is necessary to provide means for regulating fractionating conditions in order to obtain a uniform quality of side stream.

If the temperature of the oil and vapors charged to a fractionating column, the top temperature, and the column pressure all remain constant, the temperature of a side stream of constant quality withdrawn from the column will remain constant. However, the quantity of side stream withdrawn, in order to keep the quality or boiling range thereof constant, must be changed with variations in the amount and/or quality of the charging stock. Conversely, if the quantity and quality of the charging stock remain constant and the quantity of the side stream withdrawn is varied, the quality and temperature of the side stream will change. Likewise, if the quantity and/or quality of the charging stock varies and the quantity of side stream withdrawn is maintained constant, the quality or boiling range and the temperature thereof will vary. It follows therefore that the temperature of the side stream is an index of the quality thereof and the quality may be regulated by keeping the temperature constant.

Any change in the amount of the side stream withdrawn from a fractionating tower will change the quantity of the reflux flowing to that portion of the tower below the point of withdrawal. This change in the amount of reflux flowing to the lower plates of the tower will affect the degree of fractionation occurring below and will change the composition of the vapors rising from the trays below that from which the side stream is withdrawn. Since these vapors contribute to the side stream, a variation in the vapor composition will cause a variation in the quality or boiling range of the side stream. Therefore, if the quantity of side stream withdrawn is varied so as to keep the quantity and quality of the reflux flowing downwardly through the tower constant, the quality of the side stream can be maintained constant.

Since the temperature of the side stream is an index of its quality and since the quality of the side stream can be maintained constant by controlling the rate of withdrawal of the side stream, it is possible to automatically maintain a side stream of constant composition by means of a mechanism to control the temperature of the side stream which functions by varying the rate of withdrawal.

The control of side stream withdrawal may be attained in various ways. However it has been found that the location of the control point or thermal element in the vapor space of the fractionating tower or in the liquid on the tray from which the side stream is to be withdrawn or in the down spouts is not satisfactory since the rate of heat transfer to the thermal element is too slow for satisfactory control. I have found that by locating the thermal element in the eduction line from the fractionating tower, satisfactory heat transfer can be obtained by reason of the high velocity of the liquid and as a result a much more uniform side stream can be maintained.

One of the objects of my invention is the provision of means for automatically regulating the quality or boiling range of a side stream withdrawn from a fractionating tower.

Another object of my invention is the provision of means for obtaining any desired quality of the side stream from a fractionating tower.

Still another object of my invention is the provision of means for withdrawing from a fractionating tower any one of several side streams differing from each other in quality but each stream of uniform quality.

A further object of my invention is the provision of means for automatically regulating the volume of reflux flow through a fractionating tower.

The invention will be more clearly understood by reference to the following detailed description and the accompanying drawing, of which the single figure is a diagrammatic view of the apparatus suitable for the carrying out of my invention.

Referring to the drawing, the numeral 1 indicates generally a fractionating tower supported on a suitable base 2. Liquid and vapors from any suitable heating means are fed into the fractionating tower through the line 4, and vapors may be withdrawn from the top of the tower through the line 6. Located within the fractionating tower are suitable bubble trays 8. A line 10 is provided for withdrawing residue from the bottom of the tower. The withdrawal of residue from the bottom of the tower is controlled by the liquid level control 12 which actuates valve 13 in the line 10. A line 14 is provided for injecting steam into the lower portion of the fractionating tower.

A plurality of side stream withdrawal lines 15 are provided connected to individual bubble plates within the tower. Suitable valves 16 are placed in the lines 15. The lines 15 are connected to the manifold 18 which in turn is connected to the line 20 having control valve 22 therein. Lines 15, manifold 18, and line 20 are preferably insulated to prevent excessive heat loss by radiation. Line 20 is connected to the upper portion of a side stream stripping tower 24. A by-pass line 26 having therein suitable valves 28 and 30 is connected into line 20 across the valve 22. An automatic valve 32 is placed in the line 26 and the valve 32 is operated by a suitable mechanism 34 which in turn is actuated by a suitable thermal couple or thermal bulb 36 placed at any suitable point in the eduction manifold 18. A line 38 is provided for returning vapors from the top of the stripping column 24 to the top of the fractionating tower 1. Suitable fractionating plates 40 are arranged in the stripping column 24 and a line 42 is provided for injecting steam into the bottom of the column 24 to strip the light ends from the condensate flowing therethrough. A line 43 is provided for withdrawing residue from the bottom of the stripping column 24 and the withdrawal of residue therethrough is regulated by the automatic valve 44 which is actuated by the liquid level control 46.

The invention functions in the following manner:

Assume that the temperature of the feed through the line 4, the top temperature of the tower, and the tower pressure remain constant and that it is desired to withdraw a side stream through the middle line 15. In that event the valves 16 on the two end lines will be closed and the valve on the middle line open. Now assume that the composition of the crude has changed so that the per cent of the particular cut desired to be withdrawn as a side stream, has increased. The result would be that the amount of condensate on the tray to which the middle line 15 is connected would increase and as a result an increase of flow of reflux to the next lower tray would also result. The increased reflux would necessarily decrease the temperature of the vapors passing to the tray to which the line 15 is connected. Since the temperature of the vapors passing to this tray would decrease, the temperature of the condensate withdrawn from the tray would necessarily decrease. Since the thermal responsive means 36 has been set to maintain a constant temperature at the point to which it is connected in the manifold 18, it would actuate the control mechanism 34 which in turn would increase the opening of the valve 32 thereby allowing an increased flow of side stream from the tray. The increased flow of side stream would necessarily cause a decrease in the amount of reflux flowing from the tray to the tray below. As a result of the decreased flow of the reflux, the temperature of the vapors passing to the tray from which side stream is being withdrawn, would increase and the boiling range of the side stream would be restored to the desired point.

Conversely, if the amount of side stream cut contained in the feed decreased, the amount of reflux flowing from the bubble plate from which side stream is being withdrawn would decrease resulting in vapors of higher temperature reaching the tray in question and thereby increasing the boiling range of the condensate collected thereon. The increased temperature of the side stream would cause the thermal element 36 to actuate the control mechanism 34 in such manner as to further close the valve 32 thereby decreasing the amount of side stream withdrawal and increasing the amount of reflux flowing from the side stream tray to the lower trays of the fractionating tower. The increased rate of reflux flow would immediately lower the boiling range of the vapors passing to the plate from which side stream is withdrawn and thereby automatically re-establish the desired boiling range of the side stream.

Change in the rate of charge to the fractionating tower will be compensated for in the same manner as in the case of change in composition of the charge. Thus the invention is applicable to cases wherein either or both rate of charge or change in composition of charge takes place.

In accordance with my invention, the side stream can be withdrawn from any one of a number of trays by shutting off the lines connecting the other trays to the manifold 18. The control mechanism can be set for any desired temperature so that the boiling range of the side stream withdrawn from any particular tray can be changed and controlled at will.

The control mechanism is connected to a by-pass across the main line 20 in order that the operation of the fractionating equipment will not be interrupted in the event that the control mechanism becomes defective. In that event the valves 28 and 30 may be closed, the valve 22 opened, thereby allowing a continuous withdrawal of side stream from the tower 1 to the stripping column 24.

If it is desired to take off a side stream which does not require stripping, the stripping column 24 may be omitted or by-passed and the side stream led from the line 20 to a cooling coil and suitable collecting vessel.

It will be seen therefore that I have provided a method and apparatus for efficiently controlling the boiling range of a side stream withdrawn from a fractionating tower, which means is capable of permitting withdrawal of any desired side stream cut.

What I claim is:

1. Apparatus for fractionating vapors which comprises a fractionating tower, bubble plates supported in said tower, a plurality of lines connected to a plurality of plates for withdrawing condensate therefrom, valves in said lines, a manifold connected to said lines, temperature responsive means in said manifold, a line connecting said manifold to a stripping column, a valve in said line, mechanism responsive to said thermal responsive means for automatically operating said valve.

2. Apparatus in accordance with claim 1 in which the mechanism is adapted to open said valve with decrease in temperature and close said valve upon increase in temperature.

3. Fractionating apparatus comprising a fractionating tower containing a plurality of superposed bubble plates, a plurality of condensate withdrawal lines connected to said plates, a common line connecting said condensate withdrawal lines, a thermal responsive means and a valve in said common line, and means responsive to said thermal responsive means for automatically operating said valve.

4. Fractionating apparatus comprising a fractionating tower containing a plurality of superposed fractionating plates, a plurality of condensate withdrawal lines each connected to said tower immediately above a different plate, a common conduit connecting said condensate withdrawal lines, a thermal responsive means and a valve in said common conduit, and means responsive to said thermal responsive means for automatically operating said valve.

CHARLES M. RIDGWAY.